United States Patent [19]
Brun, Jr.

[11] Patent Number: 5,643,620
[45] Date of Patent: Jul. 1, 1997

[54] CONTINUOUS INJECTION MOLDING SYSTEM

[75] Inventor: Charles J. Brun, Jr., Xenia, Ohio

[73] Assignee: Electra Form, Inc., Vandalia, Ohio

[21] Appl. No.: 513,134

[22] Filed: Aug. 9, 1995

[51] Int. Cl.$^6$ ................................................ B29C 45/06
[52] U.S. Cl. ................ 425/556; 264/297.2; 264/328.8; 264/334; 425/572; 425/574; 425/576
[58] Field of Search ...................... 425/572, 574, 425/575, 576, 556; 264/328.1, 328.8, 297.2, 334

[56] References Cited

U.S. PATENT DOCUMENTS

| | | | |
|---|---|---|---|
| 3,205,536 | 9/1965 | Funck | 425/574 |
| 3,833,329 | 9/1974 | Ulmachneider et al. | 525/576 |
| 3,918,864 | 11/1975 | Braun | 425/576 |
| 4,242,073 | 12/1980 | Tsuchiya et al. | 425/572 |
| 4,470,796 | 9/1984 | Stroup et al. | 425/572 |
| 4,734,243 | 3/1988 | Kohama et al. | 425/574 |

*Primary Examiner*—Tim Heitbrink
*Attorney, Agent, or Firm*—Locke Reynolds

[57] ABSTRACT

An apparatus for serially molding articles from a plastic resin material includes an extruder having an output for producing a stream of plasticized resin material. A circular array of molds is arranged about a central area and a runner system coupled between the extruder output and the circular array of molds maintains the stream of plasticized resin material at a temperature suitable for molding. A valve is connected between the runner system and an input leading to an accumulator chamber of each mold of the circular array for sequentially directing the plasticized resin into each of the molds to form a molded article therein. A molded article extractor sequentially removes the molded article from each of the molds, and a molded article handling apparatus coupled to the molded article extractor arranges the molded articles in a series for removal through the central area.

18 Claims, 11 Drawing Sheets

CONTINUOUS INJECTION MOLDING SYSTEM

BACKGROUND OF THE INVENTION

The present invention relates to an injection molding system for serially molding articles and particularly to such a system having apparatus for serially removing the molded articles from the injection molds. More particularly, the invention relates to such an injection molding system which operates continuously, and further includes apparatus for serially removing the articles from the injection molds and apparatus for serially transporting the molded articles away from the injection molds. The invention has particular utility in the formation of parisons or preforms for the manufacture of plastic bottles.

Plastic bottles can be produced from a parison generally resembling a thick test tube which is injection molded to include a completely formed finish including, where desired, threads or other features to receive a bottle closure, and a neck ring to facilitate handling of the parison and bottle. In the so-called two-stage process, the parison is cooled generally to room temperature after molding, and can be stored for substantial periods of time before subsequent blow molding into a bottle. At the time of blow molding, the parison is fed into a machine where the parison is re-heated and blown with compressed air to form the finished bottle.

An advantage of the two-stage process is the substantial flexibility achieved by allowing the injection molding and blow molding operations to occur at different locations and times. Additionally, because the parisons are so much smaller in volume than the finished bottles they produce, the parisons are easier and more economical to handle and transport. The injection molding step is generally more time consuming than the blow molding step. To avoid any inefficient use of the blow mold, the number of injection molds and blow molds can be coordinated so that the production of parisons by the injection process matches the production capacity of the blow molding apparatus. This enables one to use both the injection and blow molding processes at maximum time efficiency by coordinating the number of each type of mold with the duty cycle required by each type of mold to achieve maximum volume production.

Some systems have been developed for simultaneously injection molding as many as ninety-six parisons. In typical simultaneous parison molding operations, a set of cores and a set of cavities are arranged to reciprocate horizontally between a "closed" position where molten resin is injected to form the parisons and an "open" position where the parisons are ejected from the injection molding machine. Production is maximized by shortening the duty cycle of the injection molding machine which results in the parisons being ejected at higher temperatures. However, at higher temperatures, the parisons are increasingly susceptible to plastic deformation which can contribute to significant bottle non-uniformity in any subsequent blowing operation. The plastic deformation is particularly acute if the parison is retained at high temperature in a horizontal attitude while supported only by one end of the parison, typically the finish or the support ring.

Another problem with the simultaneous injection molding of a large number of parisons or other articles in a single operation resides in the need for batch processing of a significant volume of resin prior to actual injection. As the volume of the batch increases, the opportunity for thermal degradation of the resin also increases due to increased residence time of the resin at elevated temperature. To eliminate the resin residence time problem while still molding a large number of articles such as parisons, it has been proposed to couple a single resin plasticizer to a plurality of mold units as in Stroup, et al., U.S. Pat. No. 4,470,796. Stroup incorporates multiple molding cavities in each mold and operates the plurality of mold units in relation to each other such that the plasticizer can be operated in a continuous rather than a batch mode. Stroup also uses a plurality of transfer devices situated around the periphery of the mold units to transfer the molded parisons to a plurality of rotary stretch blow molding machines. The use of the plurality of transfer devices represents a significant capital investment which might be avoidable if the mold units could all be serviced by a single transfer device for transferring the molded parisons to subsequent processing equipment.

Thus, there is a need for a continuous injection mold system that serially molds a plurality of articles and then serially transfers the articles to subsequent processing equipment such as a blow mold to ensure that each finished article has the same pressure-temperature history. There is also a need for a continuous injection mold system which maintains the molded articles in an upright orientation to minimize any distortion of the articles as they cool.

SUMMARY OF THE INVENTION

According to the present invention, an apparatus for serially molding articles such as bottle parisons from a plastic resin material comprises an extruder having an output for producing a stream of plasticized resin material, a circular array of molds arranged about a central area, and a heated runner system coupled between the extruder output and the circular array of molds for maintaining the stream of plasticized resin material at a temperature suitable for molding the plurality of molds. Valve means is connected between the runner system and an input of each mold of the circular array for sequentially directing the plasticized resin into each of the molds to form a molded article therein. The invention further provides a molded article extractor for sequentially removing the molded articles from the array of molds, and a molded article handling apparatus coupled to the molded article extractor for serially arranging the molded articles for removal through the central area.

According to one aspect of the invention, the runner system includes a divider head, which can include a stand pipe, having a single inlet coupled to the output of the extruder and having a plurality of channels. The divider head channels are coupled to a circular conduit formed to include a plurality of outlets. A tube allowing for variation in thermal conditions can be connected between each outlet on the circular conduit and a corresponding one of the plurality of molds. Thus, the plasticized resin material flows from the extruder through the divider head and related channels, through the circular conduit, through the tubes, and finally through the valve means to the molds in the array. The divider head, stand pipe, channels, circular conduit, and tubes are maintained at a temperature permitting the continuous flow of resin by heater means preferably in the form of an electrical heater coiled around and extending along the length of each portion of the plasticized resin material flow path.

According to another aspect of the present invention, each molding apparatus in the circular array comprises a single core and cavity, the core being arranged for vertical reciprocation with respect to the cavity to define a single molding chamber in which the article is molded. The reciprocation of the cores of the circular array are coordinated to form a sequential series of molded articles. Preferably, each molding apparatus includes an accumulator chamber of variable volume for receiving resin through the inlet from the resin material flow path as the volume of the chamber increases, the resin received therein being injected into the molding chamber as the volume of the accumulator chamber decreases. In the preferred embodiment, the volume of the accumulator chamber is greater than the volume of the section of the circular conduit between any two adjacent molds in the circular array. The serial molding operation coupled with the volume restriction of the circular conduit relative to the accumulator chamber permits the resin forming the parison to experience only minimal thermal aging between the extruder and formation of the parison in the molding chamber.

According to yet another aspect of the present invention, each molding apparatus in the circular array comprises a single core and cavity, each core and cavity being coupled respectively to a core support and a cavity support. Each core and cavity is individually removable from their respective supports for easy replacement by another core and cavity of varying conformation to permit articles of varying design to be produced. In a particularly preferred embodiment, the core and cavity employs a quick change feature as disclosed in U.S. Ser. No. 08/435,699 filed May 5, 1995, the disclosure of which is hereby incorporated by reference. The volume of the accumulator chamber can be adjusted to accommodate the volume requirements of each core and cavity combination for the articles of varying design.

In preferred embodiments useful for making plastic bottle parisons, each molding apparatus further includes a finish defining mold portion, commonly referred to as a thread split, situated between the core and cavity for cooperation therewith to form the molding chamber. Preferably, the thread split is movably coupled to the core support for reciprocation with respect to the cavity. The thread split is also movable with respect to the core to a position spaced from the core for removing the molded article from the core. The thread split is further movable to a release position where the article is released.

In one feature of preferred embodiments of the present invention, each molding apparatus in the circular array comprises cams and cam followers for moving the thread split members outwardly and inwardly in coordination with release of each molded article from the thread split molds. The cams are coupled to drive means for moving the core and the cams relative to each other. The cam followers are coupled to the thread split members and engage the cams. Preferably, the cams include a pair of diverging channels and the cam followers include pins sized to move along the diverging channels. As the drive means moves the core support and cam relative to each other, the cam followers are moved inwardly or outwardly, thereby moving the thread split members inwardly or outwardly to engage or release, respectively, the molded article.

In another feature of preferred embodiments of the present invention, the article handling apparatus is positioned to receive the molded article when it is released by the thread split members. The article handling apparatus includes accepting means for accepting the molded article from the members, transporting means for transporting the molded article to the central area, and carrying means for carrying the molded articles from the central area to a blow mold. In the preferred embodiments, the accepting means includes a rotating member having a plurality of perimetrally spaced article receivers. As the rotating member rotates, the article receivers are positioned to receive a molded article from the members. As the rotating member continues to rotate, the article receiver carries the molded article to the transporting means for further movement to the central area of the array of molds.

The transporting means includes a first moving segmented carrier, formed into an endless loop, that moves the molded article to the central area of the mold array, with each segment of the segmented carrier including a bifurcated article holder. The movement of the first segmented carrier is timed so that an article holder meets the article receiver as the rotating member moves the article receiver to the segmented carrier. Thus, movements of the rotating member and the first segmented carrier serially transfers the molded articles from the rotating member to the central area of the mold array. At the central area of the array, the first segmented carrier transfers the molded articles to the carrying means.

One advantage of the present invention is the use of a single transfer device situated to transfer the molded articles from all of the mold units into a single output stream thereby avoiding the expense and complexity of a plurality of transfer devices situated around the periphery of the mold units as was the practice in the prior art. The use of a single output also contributes to ease of handling in subsequent process operations. It will be appreciated that where the number of mold units situated in the circular array increases sufficiently, it might be possible to employ two or more transfer devices to deliver the molded articles from the mold units to a single output stream located at a central point in the array.

Additional features and advantages of the invention will become apparent to those skilled in the art upon consideration of the following detailed description of a preferred embodiment exemplifying the best mode of carrying out the invention as presently perceived.

DESCRIPTION OF THE PREFERRED EMBODIMENTS

Figure 1:
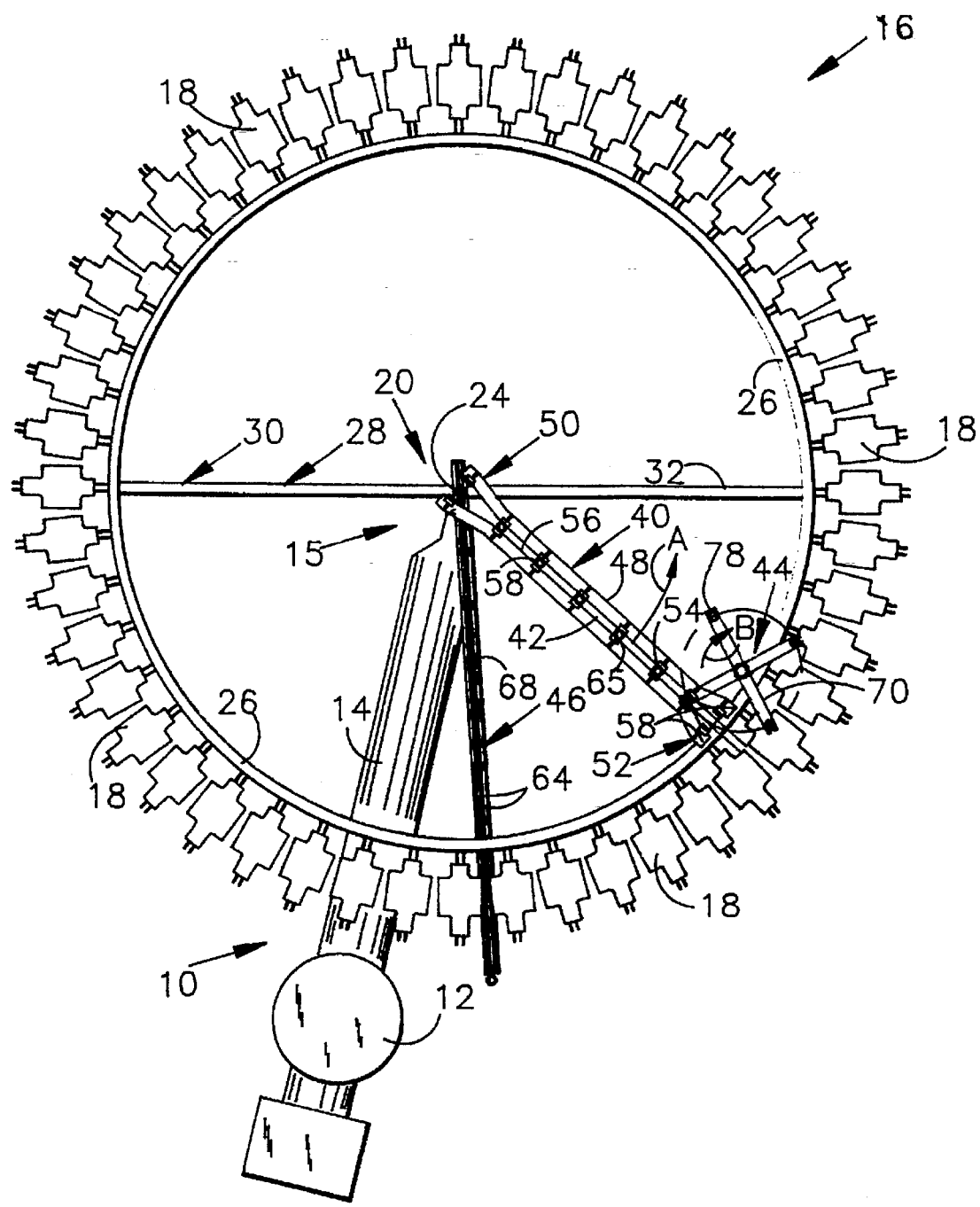
FIG. 1 is a plan view of a circular array of molds coupled to a circular heated runner system including a diametral connecting conduit extending across the circular array connecting the circular runner system to an extruder, a segmented carrier for transporting the molded articles from the molds to the central area, and a carrier for carrying the molded articles from the central area for subsequent processing.
Figure 2:
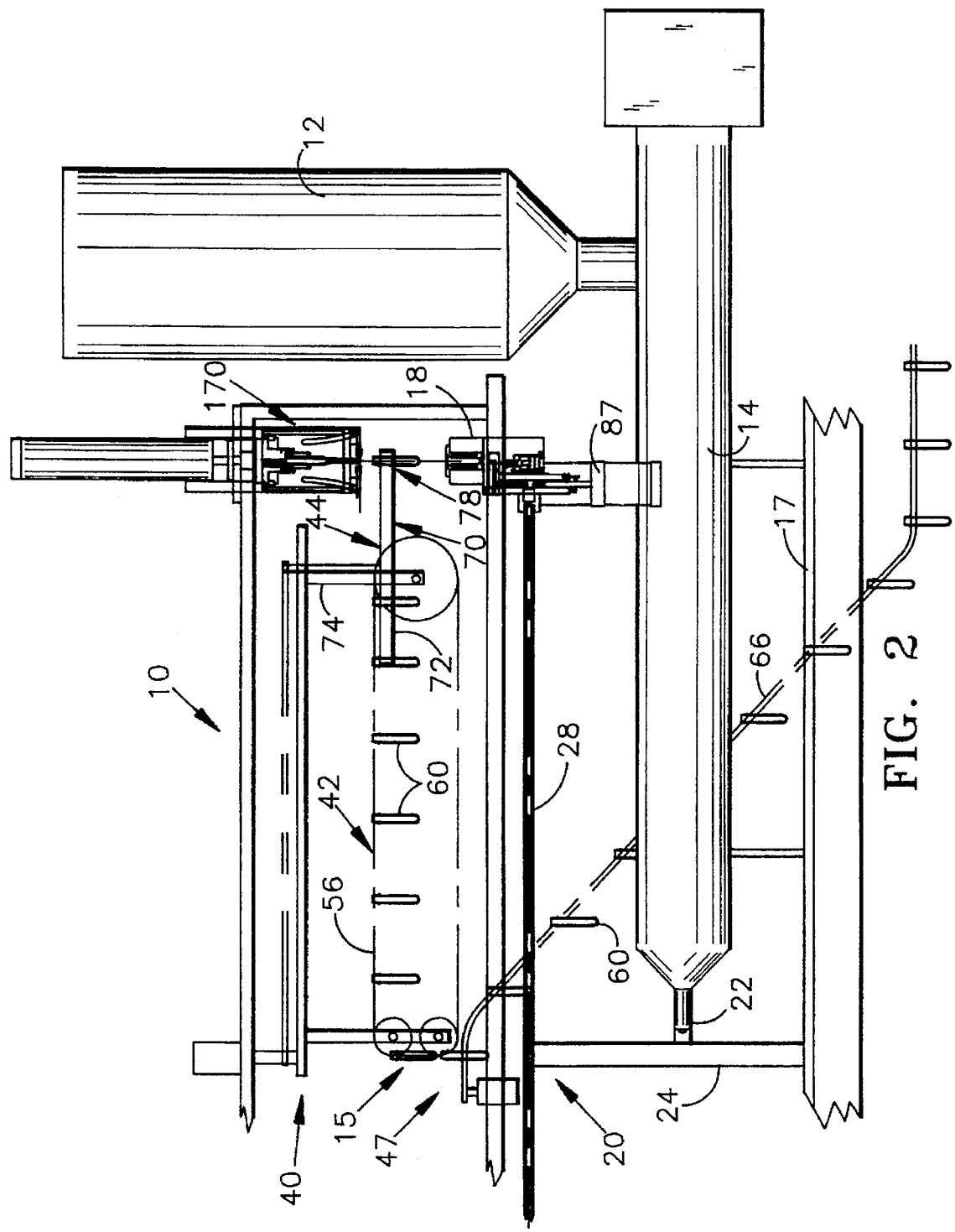
FIG. 2 is a schematic elevation view of the apparatus shown in FIG. 1.

An apparatus 10 for serially molding articles, particularly parisons for use in the manufacture of plastic containers, is shown generally in FIGS. 1 and 2. The apparatus 10 includes a hopper 12 for receiving resin for manufacturing the parisons and an extruder 14 for plasticizing the resin. An array 16 of molds 18 are fixed to a base 17 in a circular arrangement around a central area 15 and are coupled to the extruder 14 by a heated runner system 20 having a single inlet coupled to the output of the extruder 14. It will be appreciated that the number of molds 18 which make up the circular array 16 is a matter of design choice based on various criteria which will become apparent from the following description.

Each mold 18 of the array 16 is coupled to one of a plurality of outlets of the runner system 20. The runner system 20 includes a central standpipe 24, shown most clearly in FIG. 2, a circular conduit 26, and a diametral connecting conduit 28 coupled between the standpipe 24 and the circular conduit 26. The hopper 12 holds and feeds plastic resin to the extruder 14. The output 22 of the extruder 14 is coupled to the central standpipe 24 which carries the plastic resin material to the diametral connecting conduit 28. The connecting conduit 28 divides the flow of plastic resin material into at least two branches 30 and 32 leading to the circular conduit 26. It will be appreciated that the central location for the outlet of the extruder 14 and the number of branches leading from the extruder 14 to the conduit 26 is a matter of design choice based on resin flow resistance and other criteria. Alternative arrangements for the extruder 14 include the use of one or more such extruders 14 coupled tangentially to the conduit 26.

Figure 3:
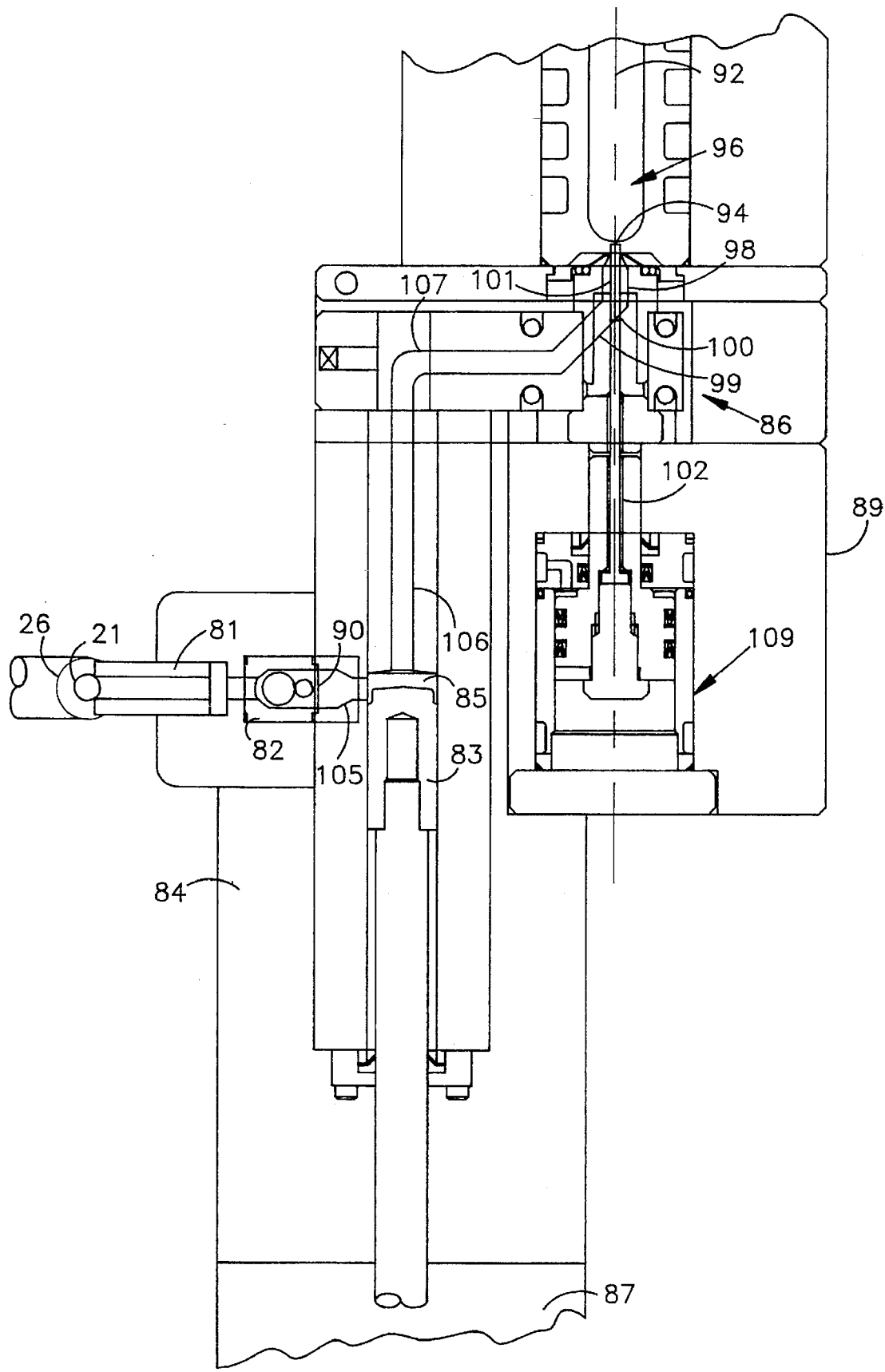
FIG. 3 is a sectional view of a check valve, accumulator chamber of variable volume, and gate valve leading to one of the molds in the circular array shown in FIG. 1.

The circular conduit 26 includes the plurality of runner system outlets. The circular array 16 of injection molds 18 is coupled to the circular conduit 26 so that each mold 18 of the array 16 is coupled to one of the outlets of the circular conduit 26. FIG. 3 more clearly illustrates the coupling between the molds 18 and the runner system outlets 21. A short tube 81 couples each of the runner system outlets 21 to a check valve 82 leading to inlet port 90 of housing 84. The housing 84 contains a accumulator chamber 85 the size of which is defined in part by a vertically reciprocal piston 83. The piston 83 is actuated by a hydraulic cylinder 87, shown in FIG. 2, which moves the piston 83 downward thus drawing molten resin from the heated runner conduit 26 past the check valve 82 through bore 105 and into the increasing volume of chamber 85. In the preferred embodiment, the volume of chamber 85 is greater than the volume of conduit 26 between any two adjacent molds 18 in the circular array 16.

After enveloping a predetermined volume of molten resin which is at or below the pressure of the outlet of the resin extruder 14, the hydraulic cylinder 87 moves upwardly increasing the pressure on the resin in chamber 85 to the higher injection pressure, the increasing pressure of the resin in chamber 85 closing check valve 82. The chamber 85 is coupled to a gate 94 which is coaxially aligned with the vertical mold axis 92 and opens into the mold cavity 96. The chamber 85 and gate 94 are joined by an internal passage 106, 107, 99, 98. An access channel 100 coaxially aligned with the central mold axis 92 branches from the internal passage 98. A gate stem 102 is coaxially aligned with the channel 100 and can extend through the channel 100 to close the gate 94. A pneumatic drive means 104 within housing 89 is coupled to the stem 102 and drives the stem 102 through the channel 100 to extend the stem into and to withdraw the stem from the gate 94 based on signals received from an external controller (not shown) controlling the opening and closing of the gate 94.

The opening of the gate 94 is coordinated with the upward movement of the piston 83 such that the molten resin in chamber 85 is pressurized and delivered through internal passage 98 and gate 94 into mold cavity 96. The downward movement of the various pistons 83 of the entire circular array 16 is coordinated to occur serially such that the extruder 14 operates continuously to fill successive chambers 85 around the array 16. The upward movement of the pistons 83 of the entire circular array 16 is coordinated to occur serially such that a series of parisons are molded in the injection molds 18. The serial molding operation coupled with the volume restriction of the circular conduit 26 relative to the chamber 85 permits the resin forming the parison to experience only minimal thermal aging between the extruder and formation of the parison.

Figure 4:
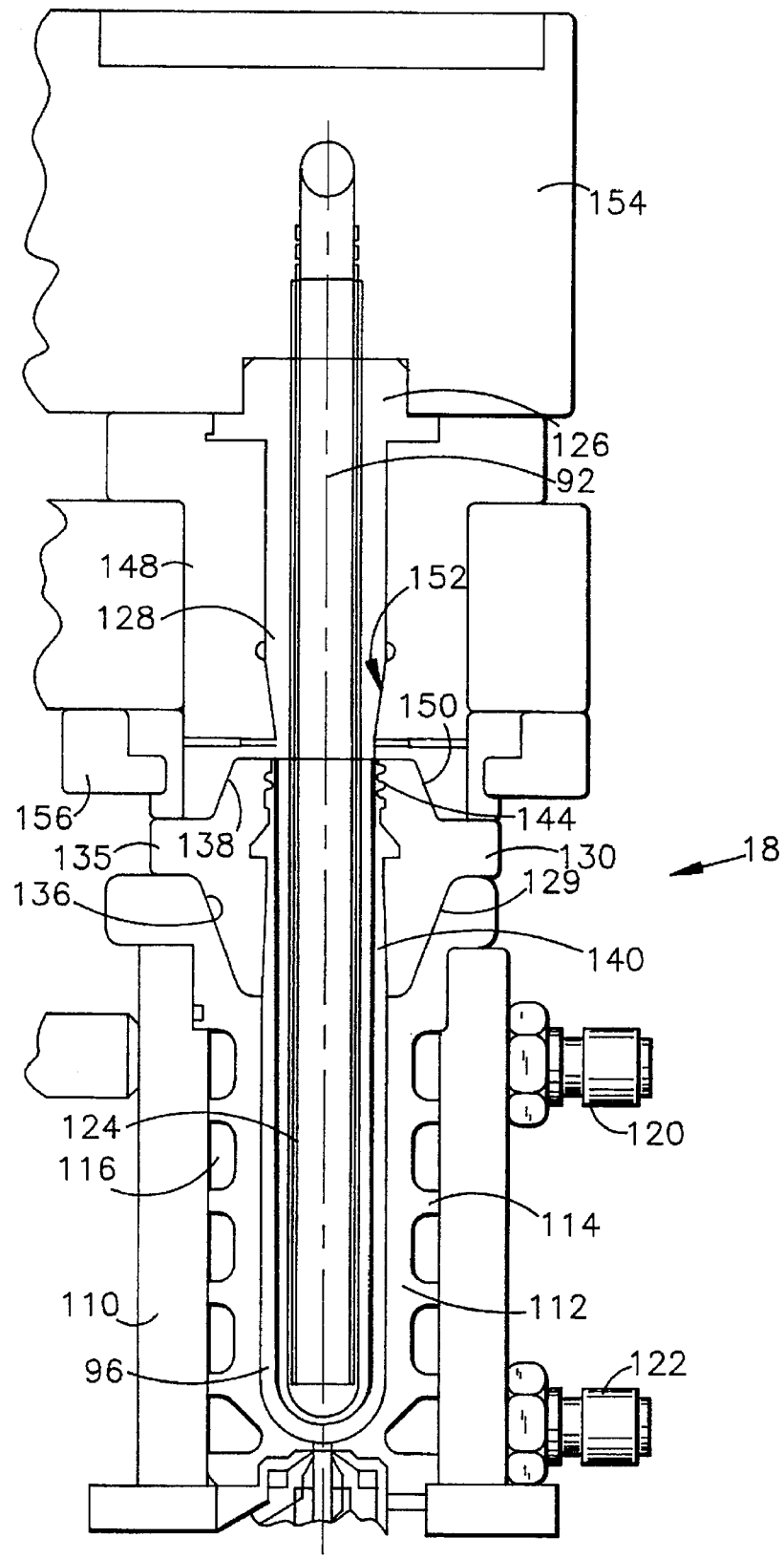
FIG. 4 is a sectional detail view of one of the injection molds of the circular array.

Each of the molds 18 is shown in greater detail in FIG. 4 to include a water jacket 110 receiving a mold cavity element 112 centered therein and extending coaxially with the central mold axis 92. The mold cavity element 112 is formed to include outwardly facing fins 114 contacting the inner surface of jacket 110 to define perimetral channels 116 for receiving a flow of cooling water. The perimetral channels 116 are coupled to each other and to a cooling water inlet 120 and a cooling water outlet 122. Thus, the cooling water flows from the cooling water inlet 120, through the perimetral channels 116, and out the cooling water outlet 122, thereby controlling the temperature of the mold element 112. The inner surface of mold element 112 defines the outer surface of mold cavity 96.

The mold cavity 96 is further defined by a mold core rod 128 which is aligned with the central mold axis 92 and defines the shape of the interior surface of a parison 60 to be molded in the cavity 96. The mold core rod 128 includes a water fountain 124 which controls the temperature of the core rod 128. An upper end 126 of the mold core rod 128 and water fountain 124 is received in header 154. The mold core rod 128 is secured to the header 154 by a collar 148 having an inside tapered surface 152 conforming to the outer surface of the upper portion of core rod 128. The collar 148 also includes a lower tapered surface 150 adapted to conformably engage an upper surface of a thread split 130.

The thread split 130 is coaxially aligned with the central mold axis 92 and is positioned in the diverging top opening 129 of mold cavity element 112. The thread split 130 consists essentially of a bifurcated collar 135 which is coupled to a bracket 156 so as to allow the two halves of the bifurcated collar 135 to move laterally with respect to each other. The bifurcated collar 135 includes a downwardly facing converging shoulder 136 that conforms to the size and shape of the top opening 129 for sealingly engaging the mold cavity member 112. The bifurcated collar 135 also includes an upwardly facing converging shoulder 138 and a central channel 140 through which the mold core rod 128 extends. The central channel 140 includes inwardly facing grooves 142 that define a set of threads 144 and a support ring 146 to be formed in the finished parison 60, and cooperates with the mold core rod 128 to thereby define the shape of the top portion of the parison 60. Thus, the thread split 130 defines the finish portion of the parison 60 including threads 144 and support ring 146, and then uses the threads and support ring to manipulate the finished parison 60. The upwardly facing converging shoulder 138 on the bifurcated collar 135 conforms to the size and shape of the downwardly facing diverging opening 150 on collar 148 which serves to hold the bifurcated collar 135 together during the injection process.

Referring to FIGS. 5–10, the molds 18 further include a vertical bar 152 rigidly attached to the base 17 and to the valve means housing 89 and extending upwardly therefrom. First and second brackets 154 and 156, respectively, are coupled to the vertical bar 152 by sleeve bearings 158 and 160 which are configured to slide along the vertical bar 152. The mold core rod 128 is coupled to the first bracket 154 and the bifurcated collar 135 is slidably engaged by the second bracket 156. A driver 134 is coupled to the brackets 154, 156 so as to move the mold core rod 128 and the bifurcated collar 135 either together as a unit relative to the mold 18 or separately relative to each other.

Figure 5:
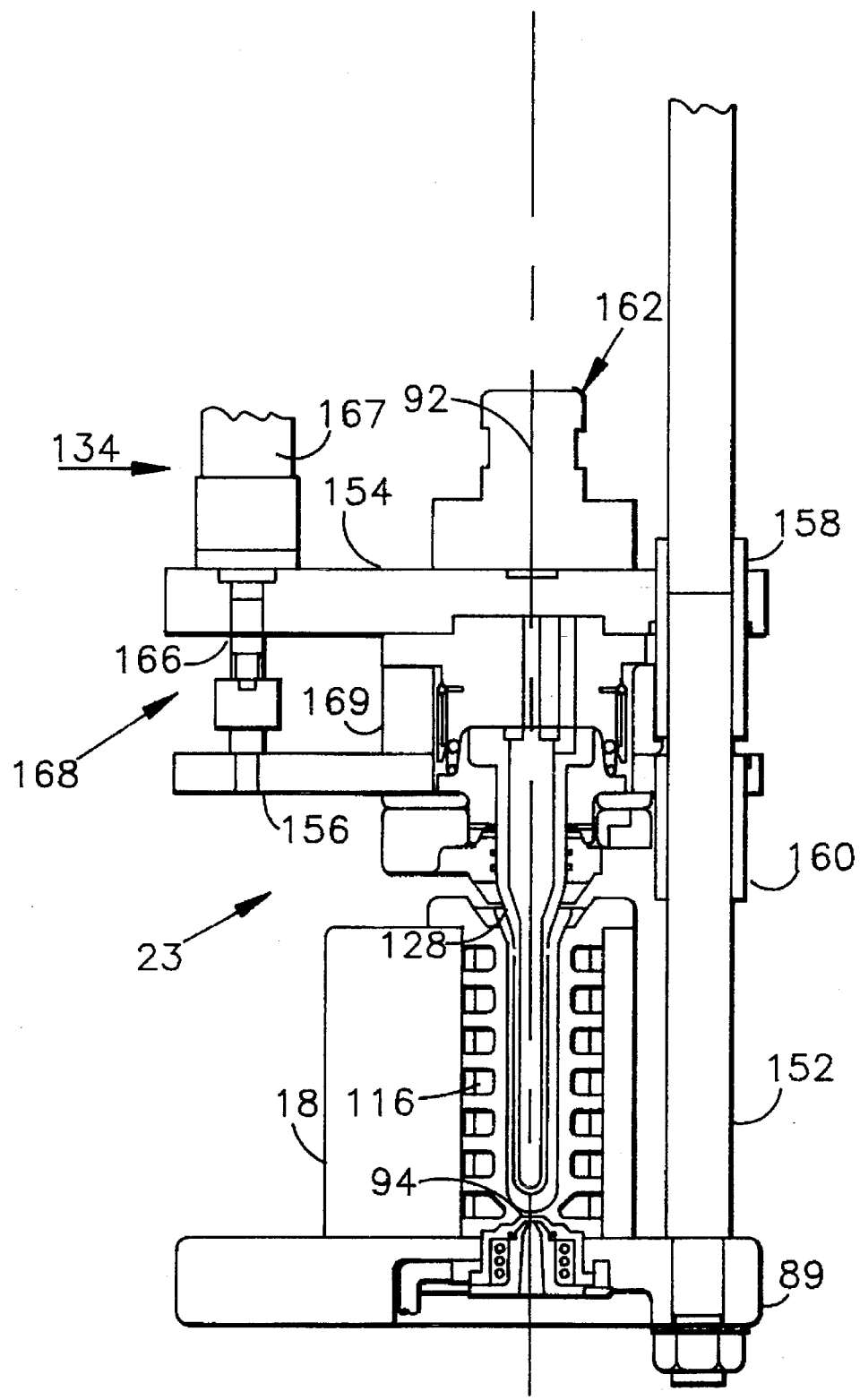
FIG. 5 is a sectional view of one of the injection molds and mold clamp assemblies shown in FIG. 2, with the mold positioned in a nearly closed position prior to receiving plasticized resin.
Figure 6:
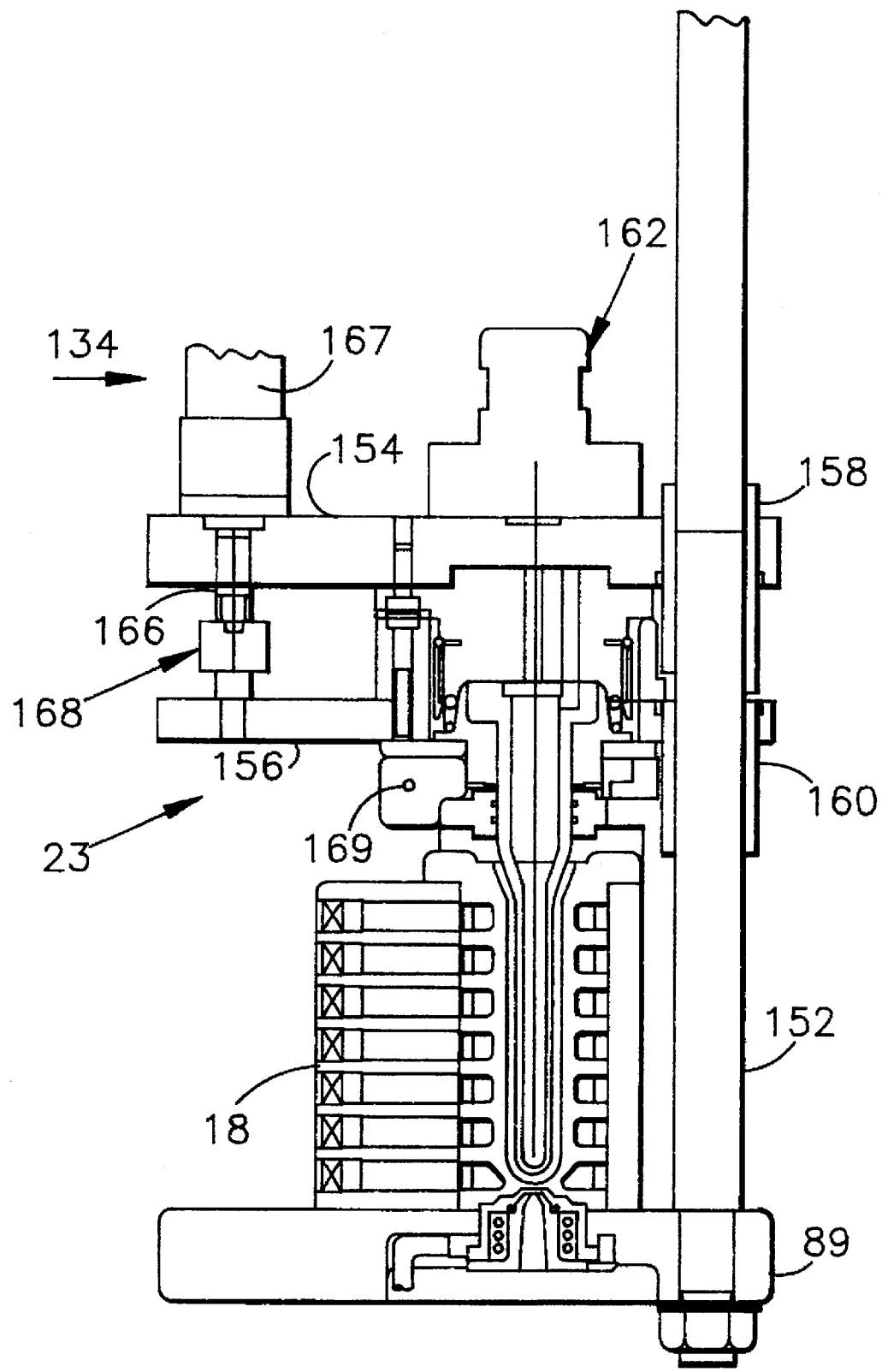
FIG. 6 is a sectional view similar to FIG. 5, with the mold fully closed and the plasticized resin material injected into the mold to form a parison.
Figure 7:
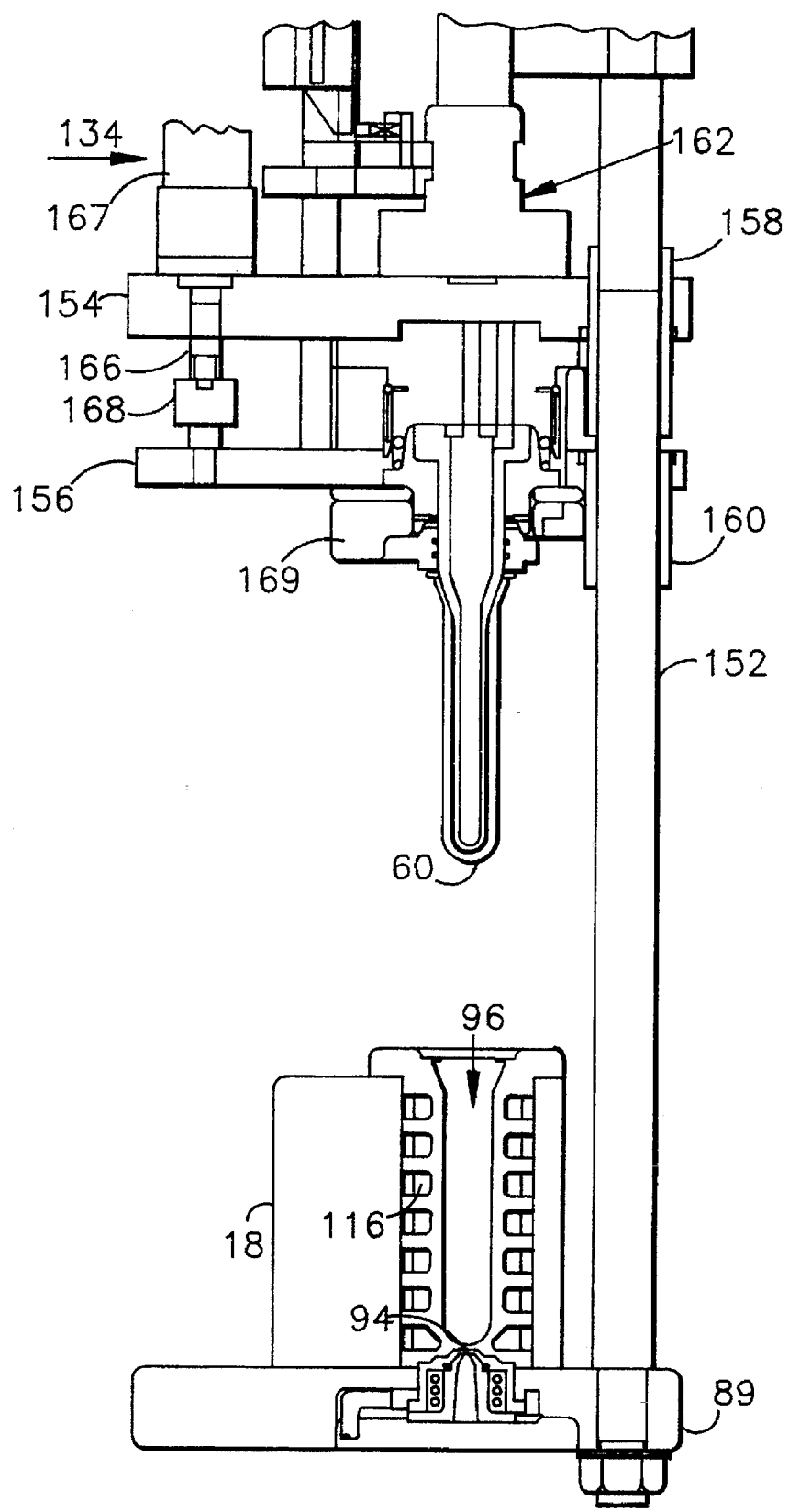
FIG. 7 is a sectional view similar to FIGS. 5 and 6 with the core removed from the mold cavity extracting the parison therewith.
Figure 8:
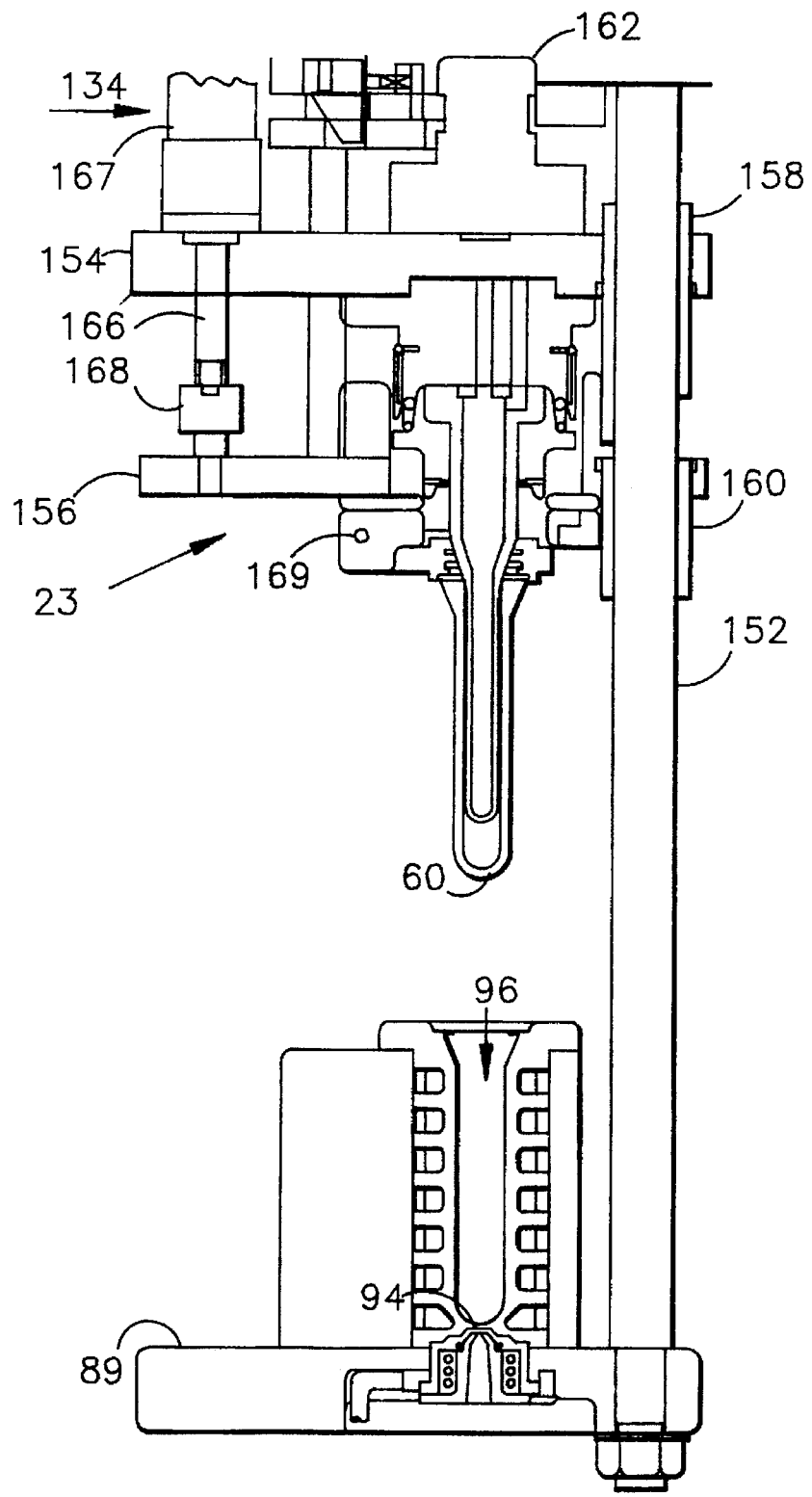
FIG. 8 is a sectional view similar to FIG. 7 showing the thread split holding the parison in fixed position and the mold core being withdrawn from the parison.
Figure 9:
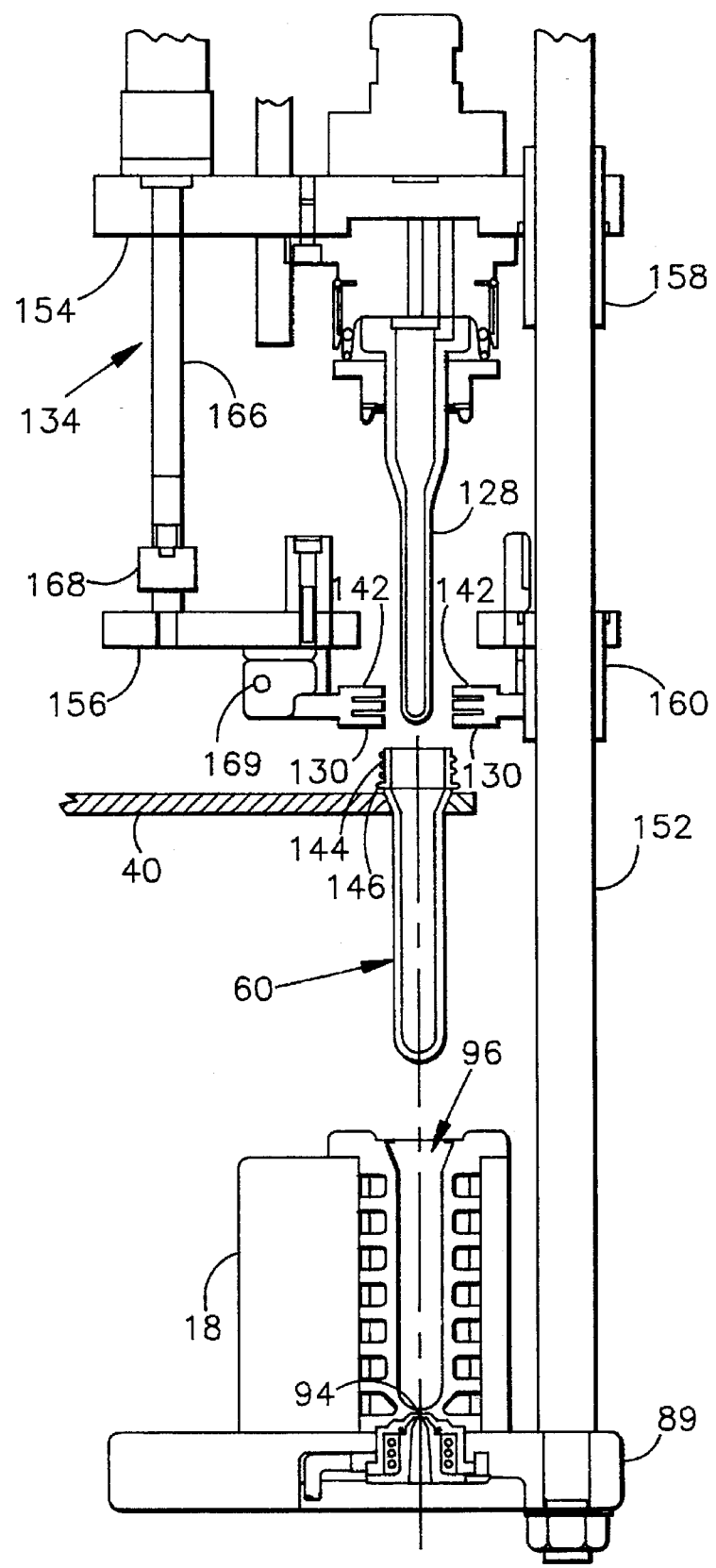
FIG. 9 is a sectional view similar to FIG. 8 showing the mold core fully withdrawn from the parison and the thread split moved to a releasing position to transfer the parison to a molded article handling apparatus.

The driver 134 includes three separate drive mechanisms. An extraction drive mechanism 162, which is preferably an air actuated cylinder, moves the brackets 154 and 156 together, and thereby moves the mold core rod 128 and the bifurcated collar 135 as a unit relative to the mold cavity 96 to extract the parison 60 from the mold cavity 96, as shown in FIGS. 5–7. After the parison 60 has been extracted from the mold cavity 96, a separation drive mechanism 168, including air cylinder 167 and piston rod 166, moves the brackets 154 and 156 relative to each other, thereby moving the mold core rod 128 relative to the bifurcated collar 135, as shown in FIGS. 8 and 9, to separate the mold core rod 128 from the parison 60. Once the mold core rod 128 has been separated from the parison 60, the continued downward movement of the separation drive mechanism 168 acts in conjunction with a releasing drive mechanism 170 to move the halves of the bifurcated collar 135 apart to release the parison 60 from the thread split 130, as shown in FIG. 9, allowing the parison 60 to fall into an awaiting receiver in the article handling apparatus 40.

The molding and extraction sequence is illustrated in FIGS. 5–9. In FIG. 5, the extraction drive mechanism 162 moves the mold core rod 128 and the bifurcated collar 135 toward a mold closing position. When the mold 18 is closed, as shown in FIG. 6, the bifurcated collar 135 seats against the top diverging opening 129 of the mold cavity 96, and the sleeve 148 and mold core rod 128 seat against the bifurcated collar 135 to cooperate with the bifurcated collar 135 to close the mold cavity 96. In the position illustrated in FIG. 6, the valve stem 102 is withdrawn from the gate 94 and the plasticized resin material is free to be injected into the mold cavity 96 under pressure generated by piston 83 in accumulator 85.

After the plasticized resin material has been injected into the mold cavity 96 and the resin cooled by the coolant in channels 116 to form the parison 60, the extraction drive mechanism 162 withdraws the mold core rod 128 and the bifurcated collar 135 as a unit from the mold cavity 96, as illustrated in FIG. 7. Because plasticized resin shrinks upon cooling, the parison 60 has a tendency to stay with the mold core rod 128. Additionally, the inwardly facing grooves 142 of the bifurcated collar 135 hold the threads 144 and support ring 146 formed into the top of the parison 60 during the injection process, resulting in extraction of the parison 60 from the mold cavity 96.

When the parison 60 has been extracted a predetermined distance out of the mold cavity 96, the extraction drive mechanism 162 continues the movement of the mold core rod 128 upward relative to the mold 18, and the separation drive mechanism 168 is actuated to move the bifurcated collar 135 downward relative to the mold core rod 128. Since the bifurcated collar 135 is closed around the threads 144 and support ring 146, the parison stays with the bifurcated collar 135, and the mold core rod 128 is withdrawn from the parison 60, as illustrated in FIG. 8.

Figure 10:
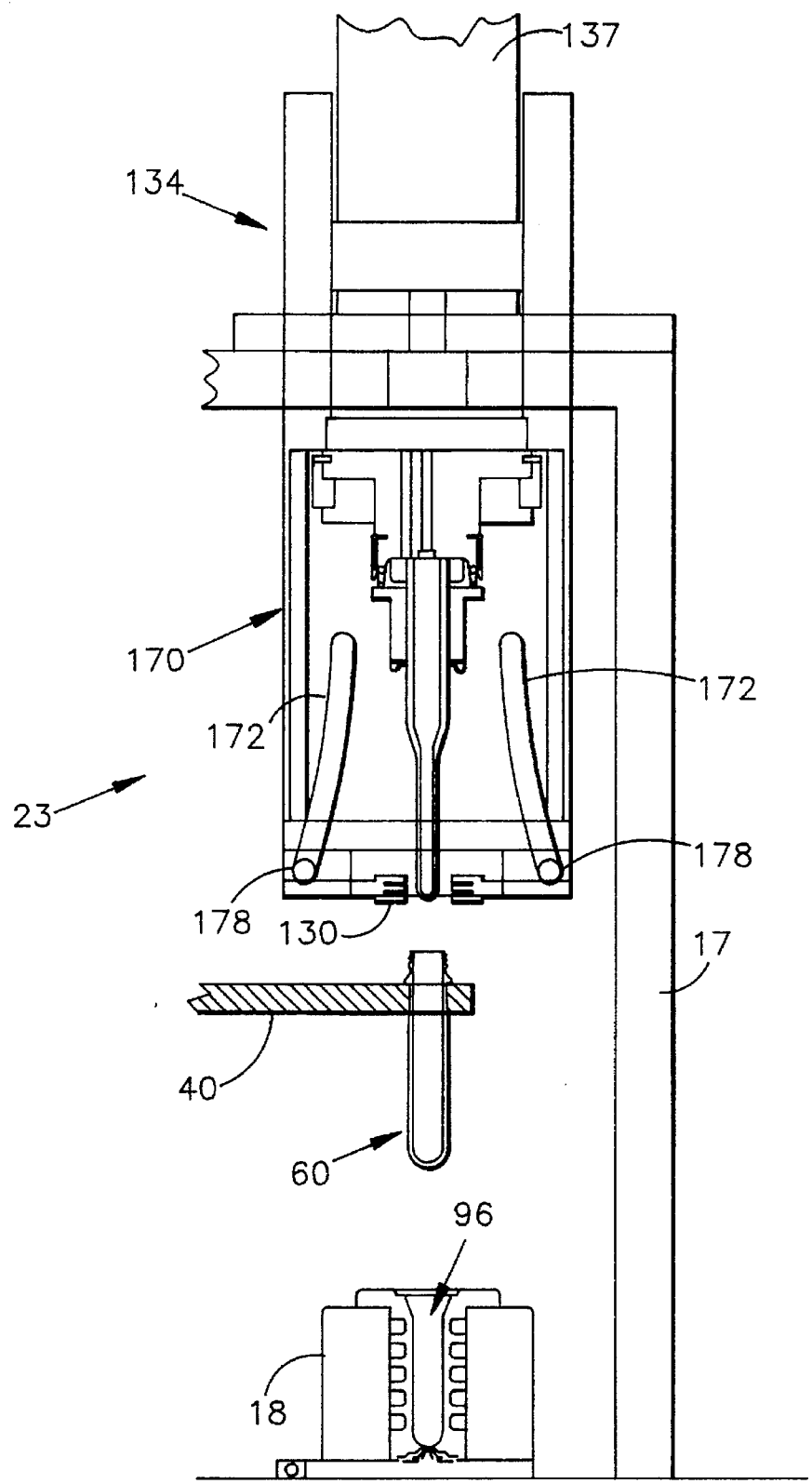
FIG. 10 is an elevation view showing a pair of diverging channels and a pair of pins engaged with the channels for controlling the thread split separation.

When the mold core rod 128 has been withdrawn a predetermined distance from the parison 60, the continued upward movement of the mold core rod 128 acts in conjunction with a releasing drive mechanism 170 to move the halves of the bifurcated collar 135 apart thereby disengaging the thread split 130 from the threads 144 and support ring 146 and releasing the parison 60, as illustrated in FIG. 9. This release is achieved as illustrated in FIG. 10 by a sleeve 170 coupled to the bracket 154 which includes a pair of downwardly extending, diverging channels 172. The separation drive pins 178 are positioned in the channels 172. As the sleeve 170 moves relative to the thread split 130, the pins are driven inwardly or outwardly causing a sliding movement of the halves of the bifurcated collar 135 relative to bracket 156 which causes the release of the parison 60 from the thread split 130. Once released, the parison 60 is free to fall into the an awaiting receiver 78 in the molded article handling apparatus 40.

FIGS. 1 and 2 illustrate one embodiment of a molded article handling apparatus 40 which accepts molded article from the circular array 16 of injection molds 18 and transports the molded articles to the central area 15. The molded article handling apparatus 40 includes a bifurcated endless belt unit 42, a rotating pinwheel 44, and a linear transport member 46. The belt unit 42 includes a pair of rails 48 disposed in generally parallel spaced-apart relation, and having first and second ends 50 and 52, respectively. The first end 50 is positioned in the central area 15 and the second end 52 is positioned adjacent the circular array 16. The endless belt unit 42 including the pair of rails 48 rotates as a unit in the direction of arrow A about the first end 50, with the second end 52 sweeping in an arc adjacent the array of injection molds 18. The sweeping motion of the belt unit 42 about the central area 15 is coordinated with the rotation of the pinwheel 44 which rotates in the direction of arrow B adjacent to the second end 52. The first and second ends 50 and 52 of the rails 48 diverge to assist in the input and output of molded articles from the belt unit 42.

The rotating pinwheel member 44 is coupled to the second end 52 of the belt unit 42 and rotates around the array 16 with the belt unit 42. The pinwheel member 44 receives the parisons 60 from the thread split 130, which extracts the parisons 60 from the molds 18, and passes the parisons 60 to the belt unit 42 for transport to the central area 15. The pinwheel member 44 is shown to comprise a cruciform segment 70 having a pair of cross pieces 72 configured to rotate about pivot axis 74. A plurality of parison receiving fittings 78 coupled to the ends of the cross pieces 72 for receiving the parisons 60 from the thread split 130 (FIGS. 4–8) and transferring the parisons 60 to the endless belt unit 42.

A plurality of bifurcated collars 54 are spaced along the length of the belt unit 42, each half 58 of each bifurcated collar 54 being carried by one of a pair of endless belts 56 carried by the rails 48. The endless belts 56 travel in unison along the rails 48 with the halves of the bifurcated collars 54 cooperating to provide a plurality of parison hangers 65 for carrying parisons 60 from the molds 18 to the central area 15. As the pinwheel member 44 rotates about the pivot axis 74, each of the parison receiving fittings 78 receives a parison 60 from the thread split 130 and moves to a position above the rails 48 where the bifurcated collars 54 come together around the parisons 60. As the pinwheel member 44 continues to rotate, each fitting 78 releases the parison 60 and moves away from the rails 48, leaving the parison 60 in a bifurcated collar 54 of the belt unit 42.

The bifurcated collars 54 travel with the endless belts 56 carrying the parisons 60 along the rails 48 from the second end 52 to the first end 50 and return to the second end 52 after transferring the parisons 60 to the linear transport member 46 at the central area 15, as best seen in FIG. 2. As the endless belts 56 travel from the second end 52 toward the first end 50, the rails 48 converge at the second end 52 so as to move the endless loops 56 together and combine their respective halves of the bifurcated collars 54 to envelop the parison 60 as the parison 60 falls from the fitting 78 at each end of cross piece 72 for transport from the circular array 16 to the central area 15. At the first end 50, the process of receiving the parisons 60 is reversed and the bifurcated collars 54 release the parisons 60 to drop into an awaiting parison receiving slot in the linear transport member 46. Whereas the bifurcated collars 54 came together to engage the parisons 60 at the second end 52, each half 58 of the bifurcated collars 54 follows the diverging path of the rails 48 at the first end 50 and separates. As the respective halves 58 separate, the parisons 60 fall into an awaiting receiving slot at a first end 47 of the linear transport member 46 for further transport from the central area 15 to further processing for storage or directly to a blow mold (not shown).

The linear transport member 46 is fixed in position relative to the circular array of molds 18 and includes a pair of rails 64 and an a pair of endless loops 66 coupled to the rails 64 to carry the parisons 60 from the central area 15. The endless loops 66 include a plurality of rings 68 sized to receive and carry the parisons 60. The rings 68 are gimballed to the endless loops 66 to ensure that the parisons 60 retain a vertical orientation, as best seen in FIG. 2, throughout the travel from the central area 15 to the blow mold (not shown) or other subsequent processing apparatus.

Figure 11:
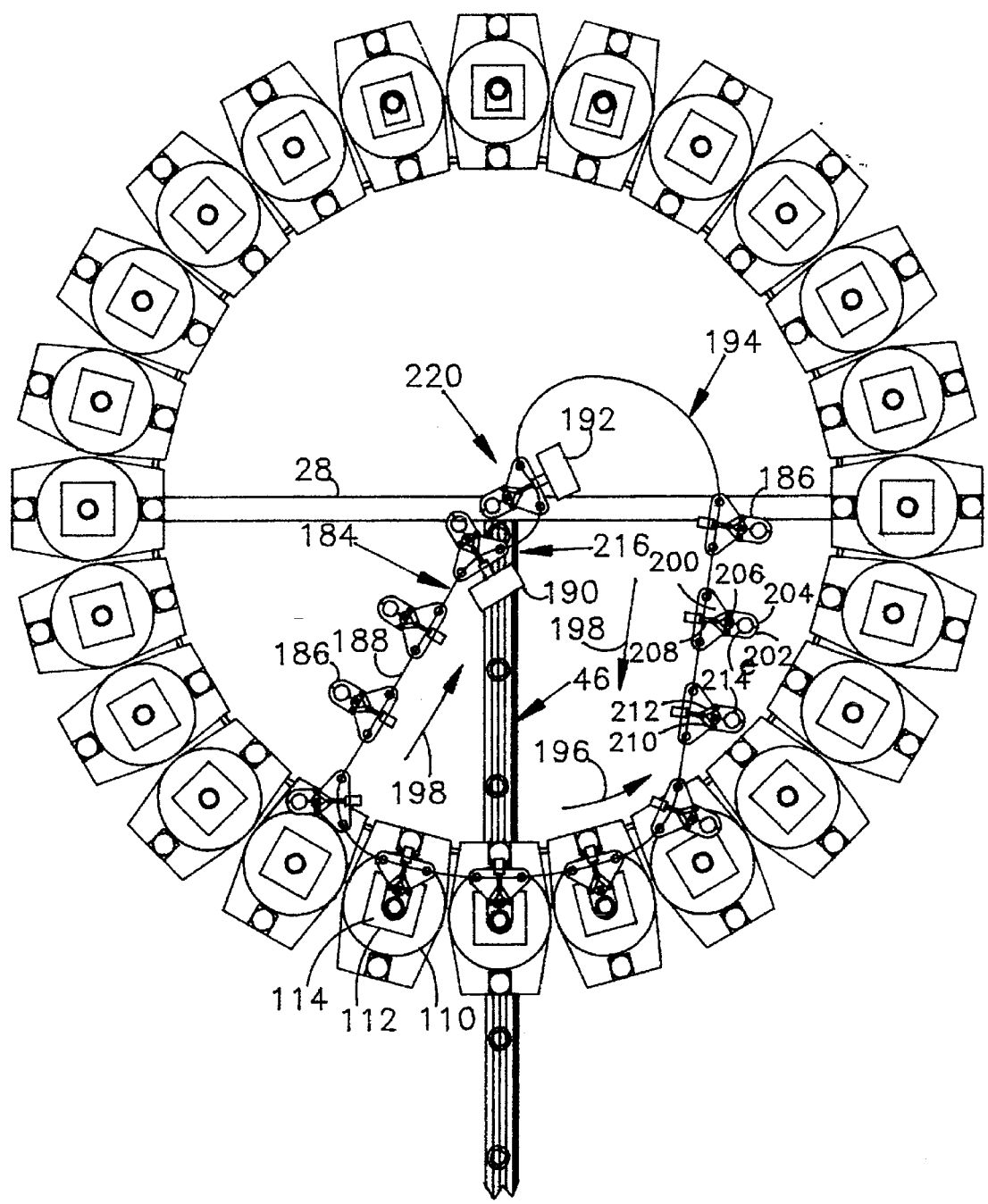
FIG. 11 is a plan view similar to FIG. 1 showing an alternative handling apparatus for transporting the parisons from the molds to the central area of the array.

An alternative embodiment of the handling apparatus is illustrated in FIG. 11. The alternative handling apparatus 180 includes a stationary member (not shown in FIG. 11) that operates in the same fashion as the stationary linear transport member 46 described above in reference to FIGS. 1-2. The alternative handling apparatus 180 also includes a rotating member 184. The rotating member 184 includes a plurality of receiving members 186 coupled to an endless loop 188, an opening trigger 190 and a closing trigger 192. The receiving members 186 include a chassis member 200 coupled to the endless loop 188, a pair of opposed fingers 202 and 204 pivotably pinned to the chassis by pivot pin 206 and an actuating link 208. A pair of connecting links 210 and 212 are pivotably connected to the fingers 202 and 204 and to the actuating link 208. As the actuating link 208 moves toward the pivot pin 206, the actuating link 208 pushes the connecting links 210 and 212 to push against the fingers 202 and 204, respectively, to close the fingers 202 and 204 together. When closed, the fingers 202 and 204 form an aperture 214 for receiving the parison 60. As the actuating link 208 moves away from the pivot pin 206, it pulls the connecting links 210 and 212, thereby pivoting the fingers 202 and 204 about the pivot pin 206 in an opening direction. As the fingers 202 and 204 pivot about the pin 206, they separate and open the parison receiving aperture 214.

The endless loop 188 is supported on a generally oval-shaped track 194, and retains that oval configuration as the rotating member 184 rotates around the array 16 of molds 18 in the direction of arrow 196. The oval track 194 is configured so that as the rotating member 184 rotates around the array 16, a portion of the endless loop 188 remains stationary relative to the array 16, and a plurality of receiving members 186 are retained in position, relative to the thread split 130 (previously described), to receive a parison 60 from the thread split 130. Thus, the endless loop 188 travels in the direction of arrow 198 as the rotating member 184 rotates around the array 16.

After the parison 60 has been released from the thread split 130, as previously described with reference to FIGS. 9-10, the parison 60 drops into the parison receiving aperture 214 formed in the members 186. The receiving members 186 follow the endless loop 188 toward the central area 15. At a position 216 above the first end 47 of the stationary linear transport member 46, the opening trigger 190 pulls the actuating link 208 to open the fingers 202 and 204 to drop the parison 60 into an awaiting receiver positioned at the first end 47 of the stationary member 46. After the parison 60 has dropped away from the rotating member 184, the receiving members 186 move along the track 194 to a closing position 220. At the closing position 220, the closing trigger 192 pushes on the actuating link 208 to close the fingers 202 and 204 to close the parison receiving aperture 214. The receiving members 186 thereafter continue to travel along the track 194 to receive another parison 60.

Although the invention has been described in detail with reference to certain preferred embodiments, variations and modifications exist within the scope and spirit of the invention as described and defined in the following claims.

I claim:

1. An apparatus for serially molding articles from a plastic resin material comprising: an extruder having an output for producing a stream of plasticized resin material, a circular array of molds arranged about a central area, a runner system coupled between the extruder output and the circular array of molds for maintaining the stream of plasticized resin material at a temperature suitable for molding, a valve connected between the runner system and an input of each mold of the circular array for sequentially directing the plasticized resin into each of the molds to form a molded article therein, a molded article extractor for sequentially removing each molded article from each of the molds, and a molded article handling apparatus coupled to the molded article extractor for arranging the molded articles in a series and carrying the molded articles to the central area for removal through the central area.

2. The apparatus of claim 1 wherein the runner system comprises a circular portion and a plurality of connector portions connecting the circular portion to all of the molds in the circular array.

3. The apparatus of claim 2 further comprising a standpipe and a connecting conduit, the standpipe having an input coupled to the extruder output and an output coupled to the connecting conduit, the connecting conduit being coupled to the circular portion.

4. The apparatus of claim 2 where said valve further comprises an accumulator chamber coupled to each mold in the circular array, the circular portion of the runner system being divided into discrete volumes between each adjacent mold in the circular array.

5. The apparatus of claim 4 wherein the volume of each of said discrete volumes of the circular portion of the runner system is less than the accumulator chamber volume.

6. The apparatus of claim 1 wherein said molded article extractor comprises a portion of each mold, a cam situated adjacent to said mold portion and a cam follower coupled to each mold portion for moving the mold portion between an article forming position and an article releasing position.

7. The apparatus of claim 6 wherein the article extractor further comprises a rotating pinwheel for receiving the molded articles from said mold portion of each of the molds in the circular array.

8. The apparatus of claim 7 wherein said molded article handling apparatus comprises an endless belt unit coupled to the pinwheel for carrying the molded articles from the pinwheel to said central area.

9. The apparatus of claim 8 wherein said molded article handling apparatus further comprises a linear transport member for receiving the molded articles from the endless belt at the central area for transporting the molded articles outward therefrom.

10. The apparatus of claim 6 wherein the article extractor further comprises a rotating member situated to rotate within the circular array of molds, the rotating member including a plurality of receiving members coupled to an endless loop.

11. The apparatus of claim 10 wherein the receiving members comprise a chassis member coupled to the endless loop, a pair of opposed fingers pivotably coupled to the chassis, and an actuating link for opening and closing the opposed fingers.

12. The apparatus of claim 10 wherein the receiving members comprise a plurality of bifurcated collars spaced along the length of a belt unit, the belt unit comprising a pair of endless belts carried adjacent to each other along a pair of rails, each half of each bifurcated collar being carried by one of the belts.

13. The apparatus of claim 12 wherein the rails of the belt unit further comprise first and second ends, the first end being positioned in said central area and the second end being positioned adjacent said circular array of molds, the first and second ends of the rails diverging to assist in the input and output of molded articles from the belt unit.

14. Apparatus for making a series of molded articles from a plastic resin material comprising: an extruder having an output for producing a stream of plasticized resin material, an array of molds arranged about a central area, each mold having an input including an accumulator chamber, a runner system coupled between the extruder output and the inputs of the array of molds for maintaining the stream of plasticized resin material at a temperature suitable for molding, the runner system comprising a circular conduit coupled to all the mold inputs of the array at equally spaced intervals, the volume of each of the accumulator chambers being greater than the volume of the circular conduit between adjacent mold inputs and each accumulator chamber including a piston within a cylinder, and coordinating means for coordinating the movement of the pistons of the array of molds so that plasticized resin is drawn into each accumulator chamber sequentially around the circular array such that the extruder operates continuously to fill successive accumulator chambers around the array.

15. Apparatus for making a series of molded articles from a plastic resin material comprising: an extruder having an output for producing a stream of plasticized resin material, an array of molds arranged about a central area, each mold having an input including an accumulator chamber, a runner system coupled between the extruder output and the inputs of the array of molds for maintaining the stream of plasticized resin material at a temperature suitable for molding, the runner system comprising a circular conduit coupled to all the mold inputs of the array at equally spaced intervals, the volume of each of the accumulator chambers being greater than the volume of the circular conduit between adjacent mold inputs, and an article extractor including a rotating member situated to rotate within the circular array of molds, the rotating member including a plurality of receiving members coupled to an endless loop for receiving molded articles from the array of molds.

16. The apparatus of claim 15 wherein the article extractor further comprises a rotating pinwheel for receiving the molded articles from each of the molds in the circular array, the rotating pinwheel delivering the molded articles to the receiving members coupled to the endless loop.

17. Apparatus for making a series of molded articles from a plastic resin material comprising: an extruder having an output for producing a stream of plasticized resin material, an array of molds arranged in a circle about a central area, a runner system coupled between the extruder output and the array of molds for maintaining the stream of plasticized resin material at a temperature suitable for molding in the plurality of molds, the runner system comprising a single inlet coupled to the output of the extruder and a plurality of outlets, a circular tube situated in close proximity to the circular array of molds and having at least one outlet adjacent to each a mold for delivering plasticized resin material to each mold, at least two tubes radially situated between the plurality of runner system outlets and the circular tube for delivering plasticized resin to the circular tube, a rotating pinwheel for receiving the molded articles from said mold portion of each of the molds in the circular array, an endless belt unit coupled to the pinwheel for carrying the molded articles from the pinwheel to said central area, and a linear transport member for receiving the molded articles from the endless belt at the central area for transporting the molded articles outward therefrom.

18. The apparatus of claim 17 further comprising a standpipe and a connecting conduit, the standpipe having an input coupled to the extruder output and an output coupled to the connecting conduit, the connecting conduit being coupled to the circular portion, an accumulator chamber coupled to each mold in the circular array, the circular portion of the runner system being divided into discrete volumes between each adjacent mold in the circular array, the volume of each of said discrete volumes of the circular portion of the runner system is less than the accumulator chamber volume.

* * * * *